United States Patent
Goodenough et al.

[11] Patent Number: 6,004,688
[45] Date of Patent: Dec. 21, 1999

[54] SOLID OXIDE FUEL CELL AND DOPED PEROVSKITE LANTHANUM GALLATE ELECTROLYTE THEREFOR

[75] Inventors: John Bannister Goodenough; Keqin Huang, both of Austin, Tex.

[73] Assignee: The Board of Regents of the University of Texas System, Austin, Tex.

[21] Appl. No.: 08/895,175

[22] Filed: Jul. 16, 1997

[51] Int. Cl.⁶ ............................................. H01M 8/12
[52] U.S. Cl. .................................. 429/33; 429/41
[58] Field of Search .................. 429/33, 41; 252/521.1; 501/152

[56] References Cited

U.S. PATENT DOCUMENTS

| | | | |
|---|---|---|---|
| 4,962,086 | 10/1990 | Gallagher et al. | 505/1 |
| 4,970,060 | 11/1990 | Belt et al. | 423/593 |
| 5,106,706 | 4/1992 | Singh et al. | 429/31 |
| 5,523,282 | 6/1996 | Simon et al. | 505/1 |
| 5,725,965 | 3/1998 | Wachsman et al. | 429/33 |

OTHER PUBLICATIONS

Feng, Man, et al.; "Fuel cells with doped lanthanum gallate electrolyte",*Journal of Power Sources,* 63 (1996) pp. 47–51 (month N/A).

Huang, Keqin et al.; "Sol–Gel Synthesis of a New Oxide–Ion Conductor Sr– and Mg–Doped LaGaO₃ Perovskite", *J. Am. Ceram. Soc.,* 79[4] (1996) pp. 1100–1104 (month N/A).

Ishihara, Tatsumi et al.; "Effects of rare earth cations doped for La site on the oxide ionic conductivity of LaGaO₃–based perovskite type oxide", *Solid State Ionics,* 79 (1995) pp. 147–151. (month N/A).

Huang, Peng–nian et al.; "Superior Oxygen Ion Conductivity of Lanthanum Gallate Dope with Strontium and Magnesium",*J. Electrochem. Soc.,* vol. 143, No. 5. (May 1996) pp. 1644–1648.

Huang, Keqin, et al.; "Characterization of Sr–Doped LaMnO₃ and LaCoO₃ as Cathode Materials for a Doped LaGaO₃ Ceramic Fuel Cell",*J. Electrochem. Soc.,* vol. 143, No. 11 (Nov. 1996) pp. 3630–3636.

Feng, Mah et al.; "A superior oxide–ion electrolyte", *Eur. J. Solid State Inorg. Chem.,* t. 31, 1994, pp. 663–672. (month N/A).

Ishihara, Tatsumi et al.; "Oxidative reforming of methane using solid oxide fuel cell with LaGaO₃–based electrolyte", *Solid State Ionics,* 79 (1995) 371–375. (month N/A).

Ishihara, T., et al. "Application of the new oxide ionic conductor, LaGaO3, to the solid electrolyte of fuel cells," Proc.–Electrochem Soc., 95–1 (Solid Oxide Fuel Cells (SOFC–IV), 244–52 (Chemical Abstracts 123:88332). (no month), 1995.

Yamamoto, O., et al. "Defects and oxide ion conductivity in oxides," Denki Kagaku oyobi Kogyo Butsuri Kagaku, 63(8), 698–702 (Chemical Abstracts 123:326467). (no month), 1995.

*Primary Examiner*—Maria Nuzzolillo
*Assistant Examiner*—Jonathan Crepeau
*Attorney, Agent, or Firm*—Flehr Hohbach Test Albritton & Herbert LLP

[57] ABSTRACT

A perovskite lanthanum gallate electrolyte doped with strontium and magnesium and a solid oxide fuel cell incorporating a doped lanthanum gallate electrolyte with a cathode on one side, an anode on the other side and a buffer layer comprising a mixed electronic and oxide-ion conductor between the anodes and/or the cathode and the electrolyte to block unwanted chemical reactions while permitting electronic and oxide-ion transport.

20 Claims, 4 Drawing Sheets

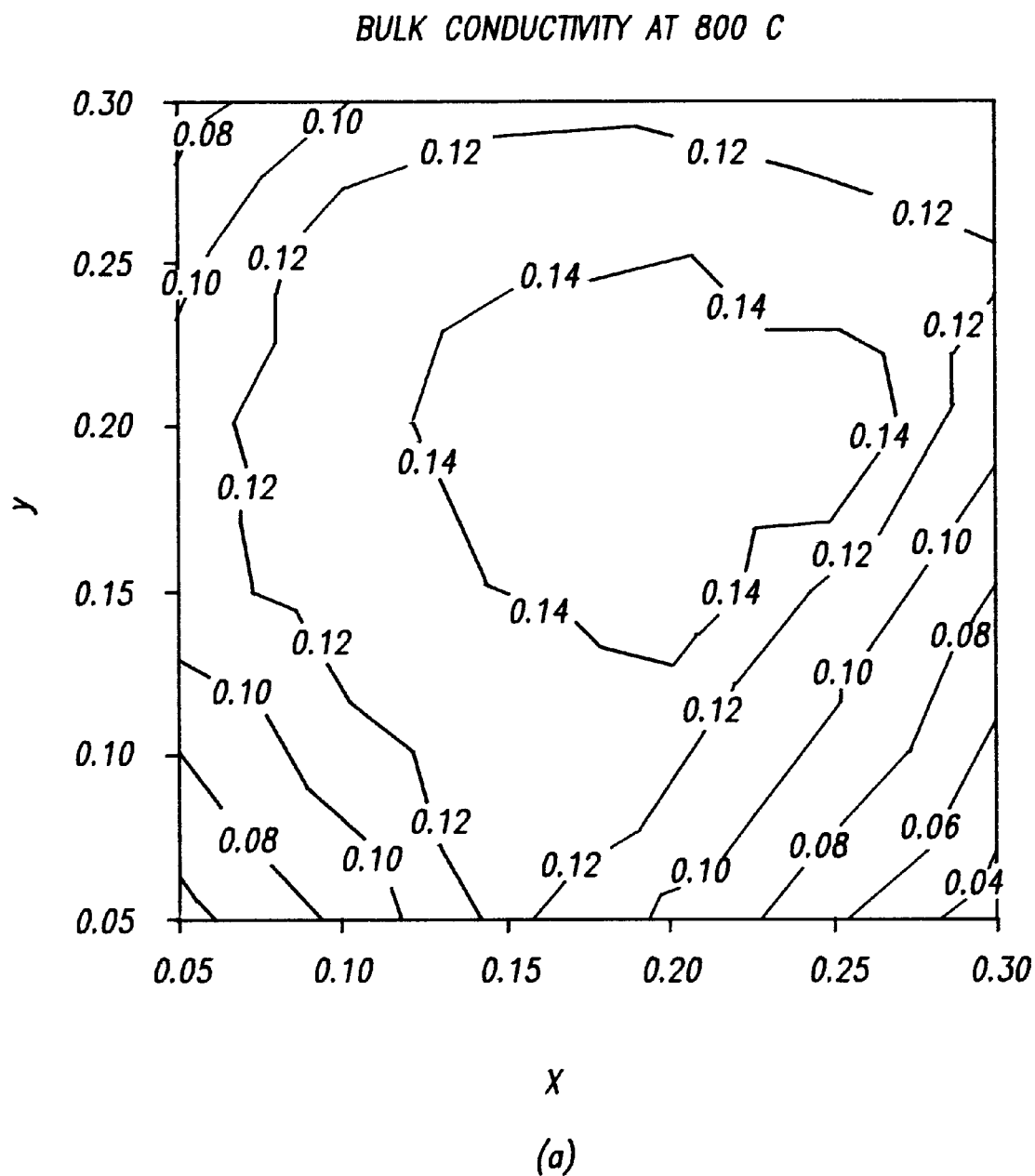
FIG.—3A

SOLID OXIDE FUEL CELL AND DOPED PEROVSKITE LANTHANUM GALLATE ELECTROLYTE THEREFOR

BRIEF DESCRIPTION OF THE INVENTION

This invention relates generally to solid oxide fuel cells and more particularly to a solid electrolyte for solid oxide fuel cells and to the use of a buffer layer between the electrolyte and one or both of the electrodes to improve solid oxide fuel cells incorporating the electrolyte.

BACKGROUND OF THE INVENTION

The solid oxide fuel cell (SOFC) promises a high conversion efficiency (40 to 60%) of chemical energy to electric power with negligible pollution and is attractive for use in the co-generation of electric power. The prototype SOFCs now being marketed use yttria-stabilized zirconia (YSZ) as the oxide-ion electrolyte. This requires an operating temperature $T_{op} \approx 1000°$ C. if conventional ceramic membranes are used. The interconnect between individual cells must be stable in both the oxidizing atmosphere at the cathode and the reducing atmosphere at the anode, and at $T_{op} \approx 1000°$ C. it is necessary to use a conducting ceramic for the interconnects. However, even the ceramic of choice, Ca-doped $LaCrO_3$, loses oxygen from the side exposed to the anodic atmosphere and gains oxygen on the side exposed to the cathodic atmosphere. This causes the interconnect membranes to warp. An operating temperature in the range $600°$ C.$<T<800°$ C. could allow the use of an oxidation-resistant stainless steel or another alloy as the interconnect material. The lower operating temperature would also reduce operating costs, increase durability, extend service life, and permit more frequent cycling.

Two approaches to a $T_{op}<800°$ C. are under active consideration: (1) reduction of the thickness of the YSZ electrolyte membrane to $1 \leq 10$ μm and (2) use of a solid electrolyte having an oxide-ion conductivity at or below $800°$ C. that is comparable to that of YSZ at $1000°$ C. The most promising traditional material for the second approach is $CeO_2$ doped with an alkaline-earth oxide, AO, or a rare earth oxide, $Ln_2O_3$, but reduction of $Ce^{4+}$ to $Ce^{3+}$ in the anodic gas introduces into the electrolyte an unwanted polaronic conduction.

There is a need for a solid electrolyte having a high oxide-ion conductivity at a reduced operating temperature, negligible electronic conductivity over a wide range of oxygen partial pressure, viz $10^{-22}<P_{O_2}<1$ atm, and stable performance over extended periods of time.

The pseudo-cubic perovskite system $La_{1-x}Sr_xGa_{1-y}Mg_yO_{3-0.5(x+y)}$ is attracting increasing attention as an oxide-ion solid electrolyte competitive with yttria-stabilized zirconia; it demonstrates an oxide-ion conductivity $\sigma_o \geq 0.10$ S/cm at $800°$ C., a negligible electronic conduction at temperatures $T<1000°$ C. over a broad range of oxygen partial pressure from pure oxygen $P_{O_2}=1$ atm) to moistened hydrogen $(P_{O_2} \sim 10^{-22}$ atm), and a stable performance over long operating periods. These superior electrical and chemical properties make it a strong candidate for use as the solid electrolyte in reduced-temperature solid oxide fuel cells (RTSOFCs) operating at or below $800°$ C.

A typical prior art doped gallate, $La_{0.9}Sr_{0.1}Ga_{0.8}Mg_{0.2}O_{2.85}$, has an ionic conductivity of 0.07–0.1 S/cm² at $800°$ C. However, at room temperature it always contains an undesirable nonconducting second phase $LaSrGaO_4$. The presence of this phase, which may gradually disappear at higher temperatures, may explain the unusually rapid decrease of ionic conductivity with decreased temperature. For instance, the conductivity, measured by a 4 probe DC measurement technique, was 0.075 S/cm at $800°$ C., but only 0.028 S/cm at $700°$ C.

OBJECTS AND SUMMARY OF THE INVENTION

It is a general object of the present invention to provide a solid electrolyte for solid oxide fuel cells (SOFCs) having superior electrical and chemical properties.

It is another object of the present invention to provide a strontium and magnesium doped lanthanum gallate perovskite solid electrolyte for reduced temperature solid oxide fuel cells (RTSOFCs).

It is a further object of the present invention to provide a phase pure strontium, magnesium doped lanthanum gallate electrolyte exhibiting increased ionic conductivity.

It is a further object of the present invention to provide an improved reduced temperature solid oxide fuel cell.

It is a further object of the present invention to provide a fuel cell having a phase pure strontium, magnesium doped lanthanum gallate electrolyte exhibiting increased ionic conductivity with anode and cathode on opposite sides of the electrolyte and a buffer layer between the anode and electrolyte.

There is provided a lanthanum gallate perovskite electrolyte for solid oxide fuel cells in which the A/B ratio of atoms of the perovskite [A (La, Sr)] and [B (Ga, Mg)] is smaller than or equal to one.

BRIEF DESCRIPTION OF THE FIGURES

The foregoing and other objects of the invention will be more clearly understood from the following description and the accompanying drawings in which:

FIGS. 3A, 3B are iso-conductivity contours for the $La_{1-x}Sr_xGa_{1-y}Mg_yO_{3-0.5(x+y)}$ system showing the highest conductivity region at $800°$ C. and at $700°$ C., respectively, in accordance with the inventions.

DESCRIPTION OF THE PREFERRED EMBODIMENT

Figure 1:
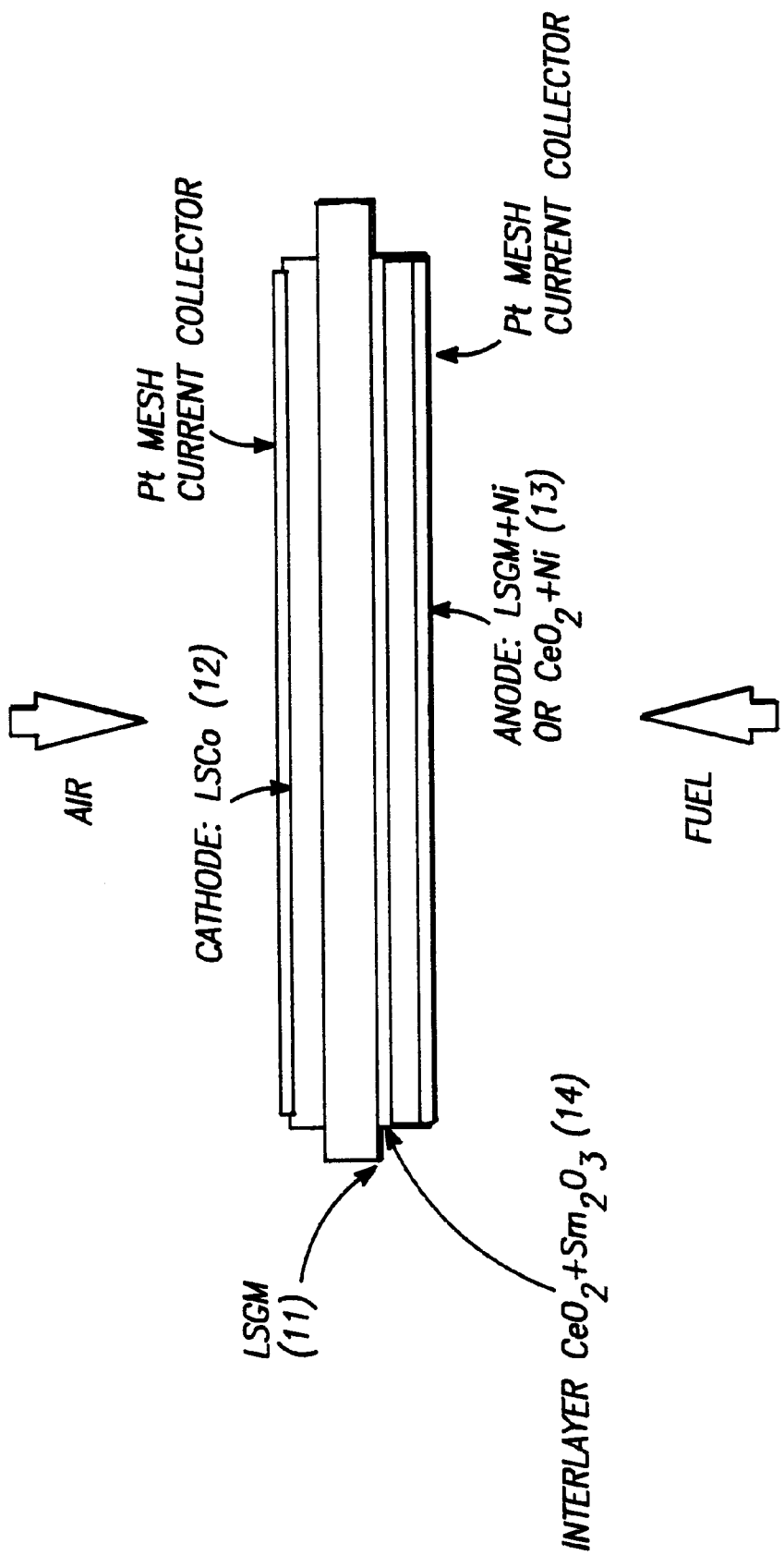
FIG. 1 shows a solid oxide fuel cell incorporating a solid electrolyte and an anode buffer layer in accordance with the present inventions.

FIG. 1 shows a fuel cell including a pseudo-cubic perovskite system as the solid electrolyte 11. This solid electrolyte comprises a phase pure lanthanum (La) gallium (Ga) perovskite doped with strontium (Sr) and magnesium (Mg). The doping is such that an A/B ratio less than or equal to one is achieved either by reducing the Sr content on the A site of the lattice or increasing the Mg content on the B site below or above that required for strict stoichiometry. That is, a non-stoichiometric compound may be formed. We have found that a phase pure perovskite compound having excellent oxide-ion conductivity without detrimental electronic conductivity in either highly oxidizing or highly reducing conditions is obtained with the following non-stoichiometric range.

Figure 2A:
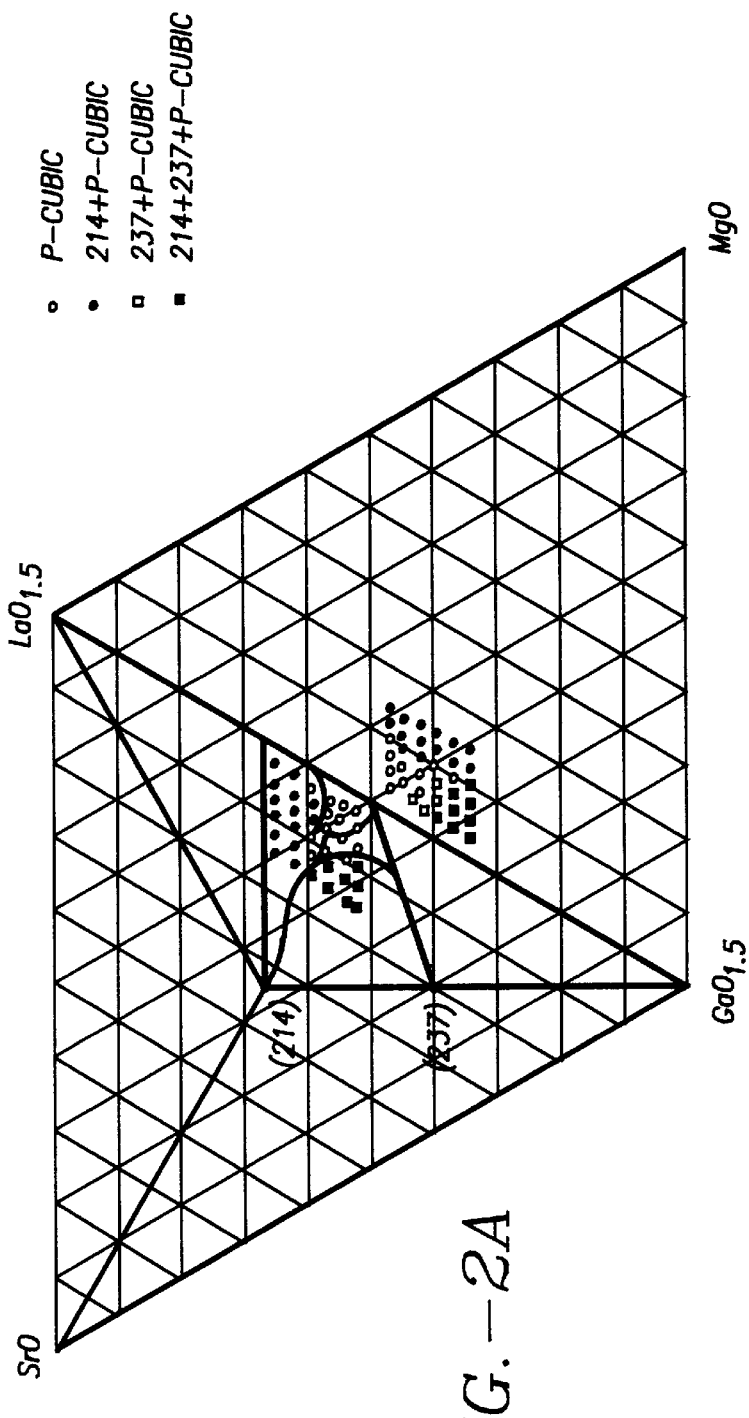
FIG. 2A is a phase diagram of the $LaO_{1.5}$-$SrO$-$GaO_{1.5}$-$MgO$ system showing the compositions of a pseudo-cubic perovskite in accordance with the inventions.
Figure 2B:
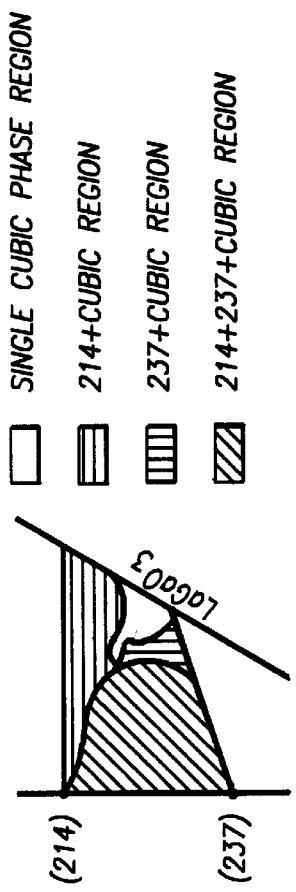
FIG. 2B is an enlarged view of a portion of the phase diagram of FIG. 2A.
Figure 3B:
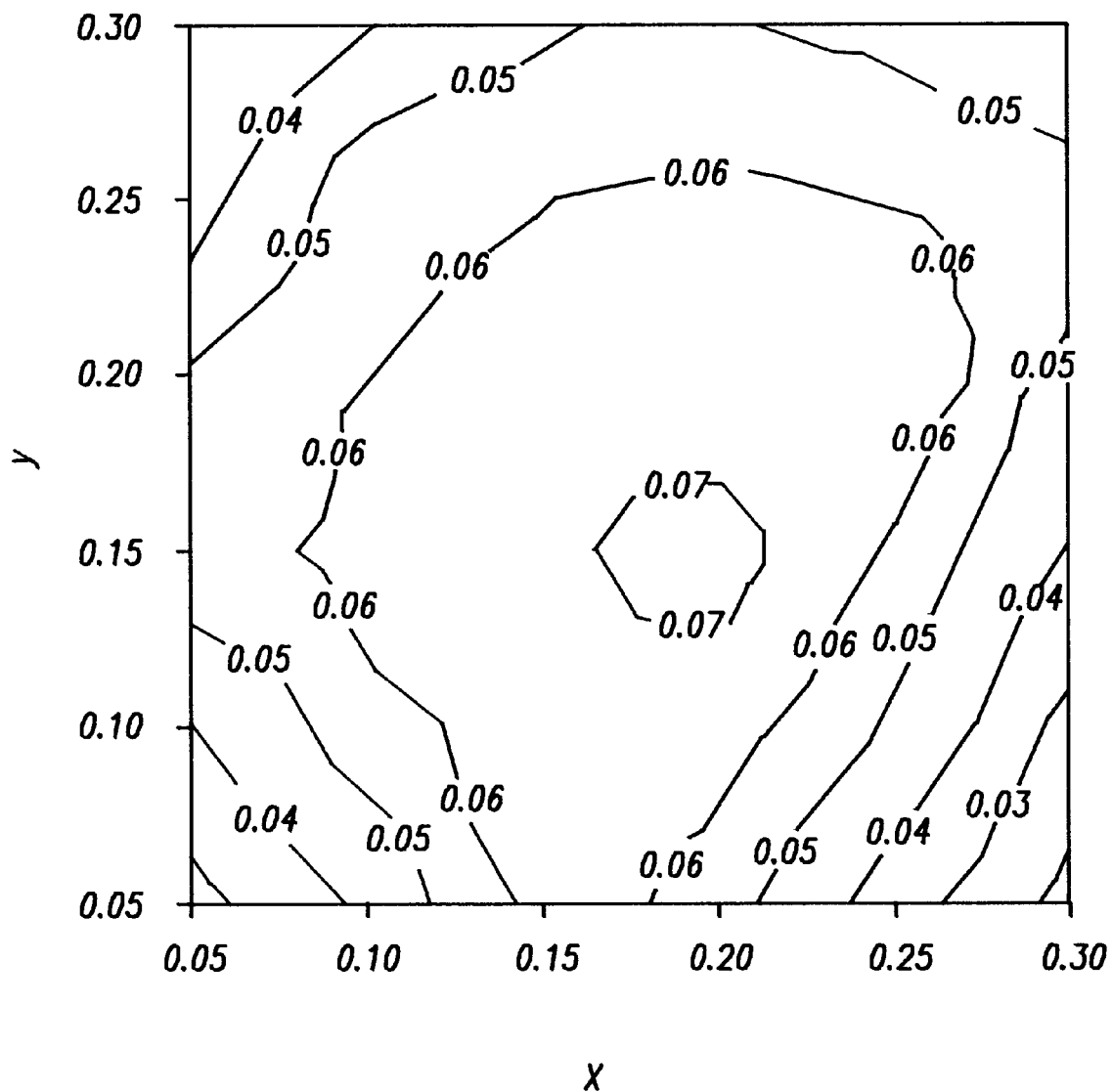

$La_{1-x-w}Sr_{x-w}Ga_{1-y}Mg_{y+z}O_{3-0.5(x+y+5w-2z)}$ where $0.1 \leq x \leq 0.3$ $0.1 \leq y \leq 0.3$ $0.01 \leq w \leq 0.04$ $0.03 \leq z \leq 0.15$ FIG. 2 is a phase diagram of compositions of a pseudo-cubic perovskite in accordance with the above compositions. Compositions falling in this range generally exhibit a conductivity $\geq 0.12$ S/cm at 800° C. and $\geq 0.06$ S/cm at 700° C. Maximum conductivities of 0.166 S/cm and 0.079 S/cm at 800° C. and 700° C. respectively, are found in the following, preferred composition range: $La_{0.8-0.85}$ $Sr_{0.15-0.2}$ $Ga_{0.8-0.85}$ $Mg_{0.18-0.3}$ $O_{2.753-2.810}$. The preferred compositions fall within the 0.12 S/cm conductivity field, while the optimum compositions fall within the 0.14–0.16 S/cm line. Iso-conductivity contours for the $La_{1-x}$ $Sr_x$ $Ga_{1-y}$ $Mg_y O_{3-0.5(x+y)}$ system are shown in FIGS. 3A and 3B for 800° C. and 700° C., respectively.

The non-stoichiometric A-site Sr deficient and B-site Mg excessive $La_{1-x-w}Sr_{x-w}Ga_{1-y}$ $Mg_{y+z}$ $O_{3-0.5\ (x+y+5w-2z)}$ compounds were prepared by mixing non-stoichiometric amounts of $La_2O_3$, $SrCO_3$, $Ga_2O_3$ and MgO where w, x, y and z range from 0.01 to 0.04, 0.1 to 0.3, 0.1 to 0.3, and 0.03 to 0.15, respectively. The compounds were mixed with the aid of acetone and fired at 1250° C. overnight. After regrinding and pelletizing, the mixture was sintered for 36 hours at 1470° C.

The fuel cell of FIG. 1 includes an $La_{0.6}Sr_{0.4}CoO_{3-\delta}$ (LSCo) cathode 12. $SrCO_3$, $La_2O_3$ and $Co_3O_4$ were used to make the $La_{0.6}Sr_{0.4}CoO_{3-\delta}$ cathode. Two types of anodes 13 were formed by the reduction of LSGM/NiO or $CeO_2$/NiO composites to give porous LSGM or $CeO_2$ anodes with metallic Ni particles in the walls of the porous channels. These composites represent standard anode materials in SOFCs.

In one example the electrodes were fabricated on the top and bottom of the 500-μm-thick electrolyte membrane 11 by screen-printing a slurry of an intimate mixture of electrode powder and organic binder. After baking at 1150° C. for two hours, Pt meshes with Pt leads and an electrode paste to achieve good contact were fixed on top of each electrode to act as current collectors. The effective electrode area was 2.5 cm². The cells were glass-sealed into $ZrO_2$ tubes at 1100° C. for 30 minutes since $ZrO_2$ has a thermal expansion coefficient similar to that of LSGM. The glass sealant used was developed by Ceramatec, Inc.

The cells were tested by placing them in the hot zone of a vertical furnace. Air was supplied directly to the cathode surface; water-moistened hydrogen (at ~30° C.) was fed to the anode surface at a rate of 100 ml/min. All of the tests and the heating/cooling of the furnace was controlled by computer; the tests were carried out in the temperature range 600° C.<$T_{op}$<800° C. with an interval of 50° C.

Single-cell performance tests of a solid oxide fuel cell (SOFC) constructed as described above and without the interlayer (14) shown in FIG. 1 using Sr- and Mg-doped $LaGaO_3$ (LSGM) with a Sr-doped $LaCoO_3$ (LSCO) cathode and an LSGM+Ni or $CeO_2$+Ni composite anode have shown improved power output compared with a SOFC using a stabilized $ZrO_2$ or $CeO_2$ as the solid electrolyte. For example, a single-cell test with an LSGM membrane 500 μm thick gave a stable peak power density of 270 mW/cm² at 800° C. with an LSCo cathode and a Ca:CeO₂+Ni anode; the power output with an LSGM+Ni anode was 300 mW/cm² at 800° C., but it was not stable. A three-electrode configuration was used to monitor the overpotential at the two electrodes as well as across the electrolyte. A high overpotential was found on the anode side: 480 mV for the $Ca:CeO_2$+Ni anode and 300 mV for LSGM+Ni anode at 0.65 A/cm² compared with 110 mV for the LSCo cathode at the same current density. We found that the cause of the high anode overpotential was a reaction between LSGM and Ni. An independent investigation of the reactivity between the LSGM electrolyte and the NiO revealed the formation of the metallic perovskite $LaNiO_3$, which is a poor oxide-ion conductor. In the formation of an anode, a NiO/LSGM or NiO/Ca:CeO₂ composite is reduced by the fuel to a porous LSGM or Ca:CeO₂ with elemental Ni on the sides of the pores. In order to avoid the formation of $LaNiO_3$ at the interface of the electrolyte and anode, we introduced a thin buffer layer between the anode and the electrolyte layer (14) of FIG. 1, that would block the unwanted chemical reaction without suppressing the oxide-ion permeability. For this purpose, we chose a material that conducts $O^{2-}$ ions and electrons under reducing atmosphere. Our initial candidate was $CeO_2$ doped with a lower-valent cation substituting for Ce so as to introduce oxide-ion vacancies as in $Ce_{1-x}Sm_xO_{2-0.5x}$ or $Ce_{1-x}Ca_xO_{2-x}$. Such a buffer layer not only blocked migration of $La^{3+}$ and $Ni^{2+}$ across it, thus preventing formation of $LaNiO_3$; it also conducted $O^{2-}$ ions and was itself a catalyst for the oxidation of the fuel, e.g. $H_2$ to $OH^-$ and eventually to $H_2O$.

Single-cell tests were made with our LSGM electrolyte 500 μm thick and an LSCo cathode area of 2.5 cm². With this standardized three-electrode configuration, two anodes of similar area were compared: Sm:CeO₂+Ni with and without Sm:CeO₂ buffer layer.

The cells with buffer layer were: Air, Pt, LsCo|optimized LSGM|Sm:CeO₂|Sm:CeO₂+Ni, Pt, $H_2$+$H_2O$, and
without buffer layer were: Air, Pt, LSCo|optimized LSGM|Sm:CeO₂+Ni, Pt, $H_2$+$H_2O$ The performances of these single cells with 500-μm thick electrolyte in the temperatures range $600 \leq T_{op} \leq 800°$ C. are summarized in the following table.

TABLE I

|  | OCV, V | current density at peak power density, A/cm² | peak power density, mW/cm² |
|---|---|---|---|
| cell with buffer layer |  |  |  |
| 800° C. | 1.06–1.09 | 1.10 | 540 |
| 700° C. | 1.10–1.12 | 0.45 | 226 |
| 600° C. | 1.12–1.15 | 0.12 | 64 |
| cell without buffer layer |  |  |  |
| 800° C. | 1.06–1.09 | 0.52 | 270 |
| 700° C. | 1.10–1.12 | 0.24 | 180 |
| 600° C. | 1.12–1.15 | 0.07 | 37.9 |

Thus there has been provided a superior solid electrolyte for solid oxide fuel cells, improved solid oxide fuel cells employing the novel electrolyte and superior solid oxide fuel cells employing the novel electrolyte and a buffer layer between the fuel cell anode and the electrolyte.

What is claimed is:

1. A strontium and magnesium doped lanthanum gallate electrolyte with an ionic conductivity >0.166 S/cm at 800° C. and $\geq 0.079$ S/cm at 700° C., having the following composition range: $La_{0.8-0.85}$ $Sr_{0.15-0.2}$ $Ga_{0.8-0.85}$ $Mg_{0.18-0.3}$ $O_{2.753-2.810}$.

2. An improved solid oxide fuel cell including
a strontium and magnesium doped lanthanum gallate solid electrolyte with an ionic conductivity >0.166 S/cm at 800° C. and ≧0.079 S/cm at 700° C., having the following composition range: $La_{0.8-0.85}$ $Sr_{0.15-0.2}$ $Ga_{0.8-0.85}$ $Mg_{0.18-0.3}$ $O_{2.753-2.810}$,
a cathode on one side of said solid electrolyte,
an anode on the other side of said solid electrolyte, and
a buffer layer for blocking unwanted chemical reaction without suppressing oxygen ion permeability between the anode and solid electrolyte.

3. A solid oxide fuel cell as in claim 2 in which the cathode comprises Sr-doped $LaCoO_3$.

4. A solid oxide fuel cell as in claim 3 in which the buffer layer comprises a mixed electronic and oxide-ion conductor.

5. A solid oxide fuel cell as in claim 3 in which the anode comprises doped $CeO_2$+Ni.

6. A solid oxide fuel cell as in claims 2, 3, 4, 5 in which the buffer layer comprises $CeO_2$ doped with a lanthanide or an alkaline-earth.

7. A solid oxide fuel cell as in claims 2, 3, 4 5 in which the buffer layer comprises $Ce_{1-x}Ca_xO_{2-x}$.

8. A solid oxide fuel cell as in claims 2, 3, 4, 5 in which the buffer layer comprises $Ce_{1-x}Sm_xO_{2-0.5x}$.

9. An improved solid oxide fuel cell including
a solid electrolyte comprising strontium and magnesium doped lanthanum gallate perovskite in which the ratio of atoms on the A site to those on the B site is smaller than or equal to one (A/B≦1) where A is La or Sr, and B is Ga or Mg,
a cathode on one side of said solid electrolyte,
an anode on the other side of said solid electrolyte, and
a buffer layer which comprises $Ce_{1-x}Ca_xO_{2-x}$ blocking unwanted chemical reaction between the anode and the solid electrolyte without suppressing oxygen ion permeability.

10. A solid oxide fuel cell as in claim 9 in which the cathode comprises Sr-doped $LaCoO_3$.

11. A solid oxide fuel cell as in claim 9 in which the cathode comprises Sr-doped $LaCoO_3$ and the anode comprises doped $CeO_2$+Ni.

12. An improved solid oxide fuel cell including
a solid electrolyte comprising strontium and magnesium doped lanthanum gallate perovskite in which the ratio of atoms on the A site to those on the B site is smaller than or equal to one (A/B≦1) where A is La or Sr, and B is Ga or Mg,
a cathode on one side of said solid electrolyte,
an anode on the other side of said solid electrolyte, and
a buffer layer which comprises $Ce_{1-x}Sm_xO_{2-0.5x}$ blocking unwanted chemical reaction between the anode and the solid electrolyte without suppressing oxygen ion permeability.

13. A solid oxide fuel cell as in claim 12 in which the cathode comprises Sr-doped $LaCoO_3$.

14. A solid oxide fuel cell as in claim 12 in which the cathode comprises Sr-doped $LaCoO_3$ and the anode comprises doped $CeO_2$+Ni.

15. An improved solid oxide fuel cell including
a strontium and magnesium doped ionically conducting lanthanum gallate solid electrolyte with the following composition range:

$$La_{1-x-w}Sr_{x-w}Ga_{1-y}Mg_{y+z}O_{3-0.5(x+y+5w-2z)}$$

where $0.1 \leq x \leq 0.3$ $0.1 \leq y \leq 0.3$ $0.01 \leq w \leq 0.04$ $0.03 \leq z \leq 0.15$ a cathode on one side of said solid electrolyte,
an anode on the other side of said solid electrolyte, and
a buffer layer which comprises $Ce_{1-x}Ca_xO_{2-x}$ blocking unwanted chemical reaction between the anode and the solid electrolyte without suppressing oxygen ion permeability.

16. A solid oxide fuel cell as in claim 15 in which the cathode comprises Sr-doped $LaCoO_3$.

17. A solid oxide fuel cell as in claim 15 in which the cathode comprises Sr-doped $LaCoO_3$ and the anode comprises doped $CeO_2$+Ni.

18. An improved solid oxide fuel cell including a strontium and magnesium doped ionically conducting lanthanum gallate solid electrolyte with the following composition range:

$$La_{1-x-w}Sr_{x-w}Ga_{1-y}Mg_{y+z}O_{3-0.5(x+y+5w-2z)}$$

where $0.1 \leq x \leq 0.3$ $0.1 \leq y \leq 0.3$ $0.01 \leq w \leq 0.04$ $0.03 \leq z \leq 0.15$ a cathode on one side of said solid electrolyte,
an anode on the other side of said solid electrolyte, and
a buffer layer which comprises $Ce_{1-x}Sm_xO_{2-0.5x}$ blocking unwanted chemical reaction between the anode and the solid electrolyte without suppressing oxygen ion permeability.

19. A solid oxide fuel cell as in claim 18 in which the cathode comprises Sr-doped $LaCoO_3$.

20. A solid oxide fuel cell as in claim 18 in which the cathode comprises Sr-doped $LaCoO_3$ and the anode comprises doped $CeO_2$+Ni.

* * * * *

UNITED STATES PATENT AND TRADEMARK OFFICE
CERTIFICATE OF CORRECTION

PATENT NO. : 6,004,688
DATED : December 21, 1999
INVENTOR(S) : Goodenough et al.

It is certified that error appears in the above-indentified patent and that said Letters Patent is hereby corrected as shown below:

Col. 1, line 21, delete the period (.) after "C";
      line 24, delete the period (.) after "C";
      line 31, delete the periods (.) after "C" (both occurrences);
      line 37, delete the period (.) after "C";
      line 58, delete the period (.) after "C";
      line 59, delete the period (.) after "C".
Col. 2, line 7, delete the period (.) after "C";
      line 50, delete the periods (.) after "800°C" and "700°C".
Col. 3, line 11, delete the period (.) after "800°C";
      line 13, delete the periods (.) after "800°C" and "700°C";
      line 14, replace "La0.8-0.85 Sr0.15-0.2" with -- $La_{0.8-0.85} Sr_{0.15-0.2}$ --;
      line 20, delete the period (.) after "C";
      line 27, delete the period (.) after "C";
      line 41, delete the period (.) after "C";
      line 45, delete the period (.) after "C";
      line 51, delete the period (.) after "C";
      line 53, replace "was" with -- were --;
      line 55, delete the periods (.) after "600°C" and "<800°C";
      line 67, delete the period (.) after "C".
Col. 4, line 33, replace "Ls" with -- LS --;
      line 39, delete the period (.) after "C";
      lines 48-50, delete the periods (.) after "800°C", "700°C" and "600°C";
      lines 53-55, delete the periods (.) after "800°C", "700°C" and "600°C"
      line 65, delete the periods (.) after "C", and "700°C".

UNITED STATES PATENT AND TRADEMARK OFFICE
CERTIFICATE OF CORRECTION

PATENT NO. : 6,004,688
DATED : December 21, 1999
INVENTOR(S) : Goodenough, et al It is certified that error appears in the above-identified patent and that said Letters Patent is hereby corrected as shown below:

Col. 5, line 4, delete periods (.) after "800°C" and "700°C".

Signed and Sealed this

Twenty-fourth Day of April, 2001

*Attest:*

NICHOLAS P. GODICI

*Attesting Officer*        *Acting Director of the United States Patent and Trademark Office*